Aug. 13, 1946.  J. McMENAMIN  2,405,751
APPARATUS FOR BREWING COFFEE
Filed Dec. 23, 1942
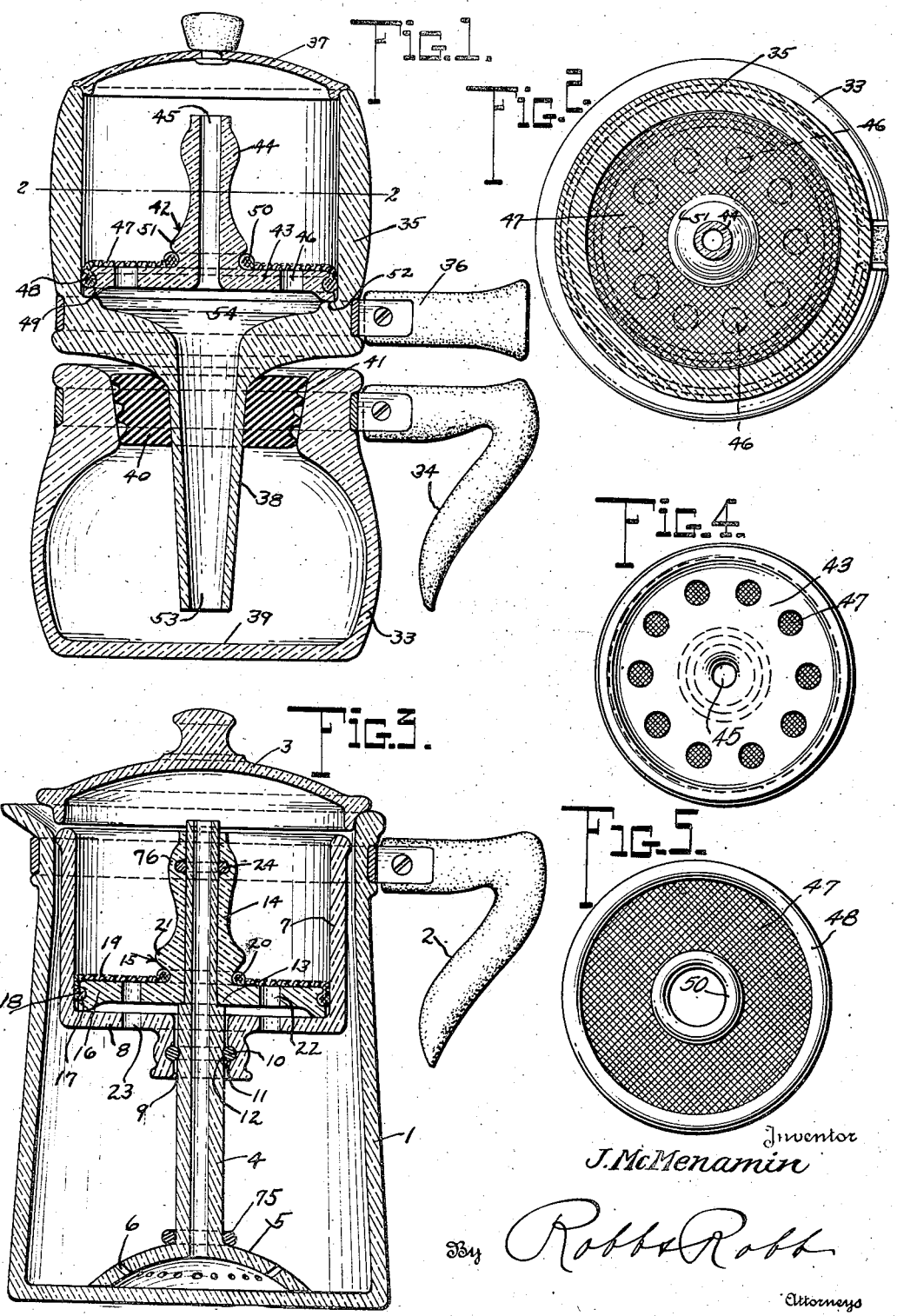
Inventor
J. McMenamin
By Robb & Robb
Attorneys Patented Aug. 13, 1946

2,405,751

UNITED STATES PATENT OFFICE 2,405,751

APPARATUS FOR BREWING COFFEE

Joseph McMenamin, Clementon, N. J.

Application December 23, 1942, Serial No. 469,943

2 Claims. (Cl. 99—289)

This invention relates to improvements in coffee makers, and particularly, to certain novel means included in said coffee makers, relating to the portion of the coffee maker wherein the coffee grounds are normally confined during the brewing operation.

The invention particularly is directed toward coffee makers adapted to be molded or otherwise formed from glass or porcelain-like material, and contemplates improvements in coffee makers of this type whereby breakage of the various parts comprising the coffee maker is obviated to a great extent.

In particular, the invention includes certain novel forms of members for supporting the coffee grounds and adapted to be moved inwardly and outwardly of the coffee receptacle, and during the said outward movement to entirely permit the ejection of the coffee grounds from the receptacle in which they are normally placed.

The ejector or coffee supporting member is of a form which may be adapted for inclusion in the well known types of coffee makers, particularly as designed to accomplish the results referred to hereinbefore. Since the three well known types of coffee makers, namely, the vacuum type, percolator type, and the drip type, are normally not thought to have common characteristics, it will be noted that this invention includes certain instrumentalities which may be incorporated into these types, which may be common to the said three types. In this respect, reference is particularly made to the novel form of filtering means and wiping means, whereby the coffee grounds are entirely confined above the ejector and supporting means so as to be completely removed from within the grounds receptacle, when the brewing operation has been completed and it is desired to dispose of the grounds.

In the drawing:

Figure 1 is a sectional view of a coffee maker of the vacuum type, including the upper coffee receptacle and the lower liquid vessel.

Figure 2 is a cross section about on the line 2—2 of Figure 1, illustrating the relationship of the supporting and ejecting member, within the grounds receptacle, in its position.

Figure 3 is a cross sectional view of a substantially well known type of percolator coffee maker, including therein the novel improvements of this invention.

Figure 4 is a bottom view of the coffee grounds supporting and ejecting member of Figure 1.

Figure 5 is a top plan view of one form of the filtering cloth which may be incorporated in the coffee maker.

Referring now particularly to Figure 3 of the drawing, there is shown a percolator type coffee maker, including a liquid vessel 1, with suitable handle means 2 carried thereby, and a top closure member 3 seated on the liquid vessel. Interiorly of the said vessel is a percolator tube 4, provided with a steam dome 5 at the bottom end thereof, adapted to seat on the inner bottom surface of the vessel 1, including the conventional steam and water openings 6 in the said dome 5.

At the upper portion of the steam tube 4 is provided a coffee receptacle 7 of substantially cylindrical formation having a bottom member 8, including an opening 9 therein adapted to receive the steam tube 4. The said opening 9 is formed with the bottom 8 of the coffee receptacle, and is provided interiorly thereof with a circumferential groove 10 adapted to receive therein a resilient gasket-like member 11. The said steam tube 4 is provided with a somewhat smaller groove 12 than the groove 10, whereby when the grounds receptacle is in its proper place on the steam tube, the gasket-like member 11 will seat in the groove 12 and maintain the coffee receptacle in its proper place relative the said steam tube.

Above the bottom 8 of the coffee receptacle is provided a shoulder 13, on the steam tube, the circumference of the steam tube 4 being decreased above the shoulder 13, whereby to receive thereabout the substantially tubular portion 14 of the coffee grounds supporting and ejecting member 15, as will be seen upon considering this illustration.

The grounds supporting and ejecting member 15 is of substantially circular configuration, adapted to seat interiorly of the coffee grounds receptacle 7, with the periphery of the flange-like member 16, which is a part of the grounds supporting and ejecting member, adjacent the said inner wall of the receptacle 7. The flange or bottom member 16 is provided at its periphery with a groove 17 adapted to receive therein a gasket-like member 18, which may be preferably formed so as to include the filtering element 19, the said filtering element preferably being made of finely woven cloth, or the like.

Adjacent the substantially tubular shaped member 14, previously referred to, is an additional enlarged portion 20, likewise formed preferably with the filter cloth 19, and of material sufficiently elastic to be stretched over the shoulder 21, formed on the substantially tubular member 14.

It will be obvious that the construction here referred to is provided to maintain the inner portion of the filter cloth 19 in place above the openings 22, formed in the flange 16. The openings 22 are spaced in any desirable position around the substantially tubular member 14, there being preferably a plurality of the same. In addition to the aforementioned holes 22, the coffee receptacle 7 is provided at its bottom with similar holes or openings 23, whereby the boiling water may return to the liquid vessel, after passing through the grounds within the coffee receptacle 7. An additional gasket-like member 24 is provided near the upper end of the tubular member 14, seated in a peripheral groove therein, and adapted to frictionally engage the reduced portion of the steam tube so as to prevent displacement therefrom, except as desired.

From the foregoing, it will be apparent that when the coffee grounds are emplaced in the grounds receptacle 7, the normal operation of the percolator may be effected by heating water in the liquid vessel 1, causing the water and steam to pass upwardly interiorly of the steam tube 4 and be deflected by the top 3 so as to pass downwardly through the coffee grounds within the receptacle 7 and through the filter cloth 19, and the openings 22 and 23, back in to the liquid vessel 1, until the desired strength of the brew has been attained.

Of course, subsequently it is desired to dispose of the grounds, and to this end, the foregoing construction has been described, referring particularly to the rolls or gasket-like portions 18, formed with the filter cloth 19, whereby when upon an upward movement of the substantially tubular member 14, availing of the same as a handle, the grounds supporting and ejecting member 16 will be forced, upwardly and completely out of the coffee grounds receptacle 7, the said member 18 effecting a wiping action along the substantially cylindrical wall of the coffee grounds receptacle 7, during this removal operation, and thus an ejecting action of the grounds is effected. Furthermore, by this construction, if it is desired, the enlarged portion of the bottom 8, in which the passage 9 is provided, may be grasped and by a downward movement of the coffee grounds receptacle 7 a similar ejecting action will be effectuated, and the grounds in like manner completely removed so as to prevent any of the grounds from finding their way into the brew. This construction obviously provides a desirable manner of removing the coffee grounds from the coffee grounds receptacle 7, and at the same time prevents any of the grounds, during the brewing operation, from obtaining access to the coffee brewed.

It will be apparent that the roll like member 18 is of sufficiently resilient construction so as to enable it to be seated firmly within their respective grooves in the flange members so as to retain the filter cloth in its proper place.

Referring now to Figure 1 in which the vacuum type of coffee maker is embodied particularly in accordance with the invention herein described, it will be noted that this coffee maker comprises a lower liquid vessel 33, provided with a handle 34, and a coffee grounds receptacle 35 provided with a handle 36, the coffee grounds receptacle likewise being provided with a top closure member 37. The coffee grounds receptacle 35 is provided with a downwardly extending tubular portion 38, preferably formed integrally therewith, adapted to extend into the interior of the liquid vessel 33, terminating substantially adjacent the bottom 39 of the said liquid vessel. Since this substantially tubular member 38 is integral with the coffee receptacle 35, it is adapted to position the said receptacle above the vessel 33 upon insertion in a resilient washer-like member 40, preferably of rubber or the like, so as to sealingly engage the outer portion of the tubular member 38 with the gasket and cause the washer-like member 40 to engage the mouth or opening 41 provided in the liquid vessel 33, the foregoing illustrating generally the construction.

However, upon considering further Figure 1, it will be noted that the coffee grounds receptacle 35 is provided with a grounds supporting and ejecting member 42. This member 42 is formed with a flange-like member 43, adapted to be received within the substantially cylindrical interior of the receptacle 35 with the periphery thereof adjacent the said cylindrical wall. Formed integrally with the flange-like member 43 is a substantially tubular member 44, provided with an opening 45 therein, the said substantially tubular member being fixed preferably centrally of the said flange-like member 43. The flange-like member 43 is further provided with holes or openings 46 for purposes that will be understood hereinafter.

The flange-like member 43 is adapted to have placed thereon the filter cloth 47, the said filter cloth being formed substantially in accordance with the Figure 3 disclosure, and being provided with the rolls or gasket-like members 48 adjacent the outer periphery of the flange-like member 43, being seated in a groove 49 formed in said periphery.

In accordance with the practise illustrated in Figure 1, the filter cloth or element 47 is provided at its interior with a similar enlarged roll or gasket member 50, adapted to engage the substantially tubular member 44, beneath a shoulder 51 provided thereon. The filtering element performs a similar wiping action to that heretofore disclosed, when it is desired to remove the coffee grounds from the grounds receptacle 35, upon upward movement of the ground supporting and ejecting member 42, as before described.

It will be noted that the coffee grounds receptacle is provided with a shoulder 52 to support the grounds ejecting and supporting member 42 in place within the said grounds receptacle 35. The substantially tubular member 38 previously referred to is provided with a passage 53 extending upwardly and adjacent the bottom portion of the grounds receptacle 35, at said bottom portion being enlarged so as to provide a much larger passage or portion 54 for purposes that will be hereinafter set forth.

In order to distinctly point out the desirability of the just described form of the invention, it might be noted that the construction referred to is substantially different from the construction availed of in known vacuum type coffee makers in view of the novel means of removing the grounds from the grounds receptacle 35, the same comprising the grounds supporting and ejecting member 42 with the filter element thereon, providing a wiping action of the interior wall of the coffee grounds receptacle 35 upon movement of the said supporting and ejecting member outwardly from the receptacle.

In the known type of vacuum brewers, the brewing operation consists in placing the water in the lower liquid vessel, and the coffee grounds within the upper grounds receptacle, placing the brewer over a flame, and causing the water to boil. The water and steam pass upwardly through the coffee, through a known filtering instrumentality, and in order to prevent a fracture or breakage of the coffee receptacle it is necessary for the operator to be careful that the steam and water do not rise too violently within the passage provided therefor, since the coffee grounds receptacle is normally not heated very much above the atmosphere generally surrounding the same. If the water and steam are permitted to violently rise, the subsequently rising temperature of the grounds receptacle will be so rapid that the previously described fracture or breakage of the coffee grounds receptacle will take place. Therefore, the present invention provides a distinctly advantageous construction, whereby the aforementioned breakage is obviated, the same being apparent upon a consideration of the operation of the brewer in accordance with the following:

At this point, it should be noted that in ordinary vacuum type brewers, the operator must lower the flame immediately upon the water, and steam starting to rise in the coffee grounds receptacle. However, the operation of the coffee brewer of this invention may take place without the previously mentioned close watch over the brewing operation. The water in the liquid vessel 33 is brought up to its boiling temperature, the water and steam rising in the passage 53, and being distributed beneath the grounds supporting and ejecting member 42 in the passage 54, a portion of the said steam and water entering the openings 46 in the flange 43 and passing upwardly through the filter cloth 47 whereby the brewing operation is effected from below the coffee grounds within the coffee grounds receptacle 35.

However, the passage 45 leading from the enlarged passage 54 is designed so as to provide a sort of safety valve, to prevent the too rapid rise of the steam, water, and temperature within the coffee grounds receptacle 35, since the area of the said passage is proportioned to the area of the openings 46, whereby a portion of the steam, and, of course, a portion of the water will be permitted to rise within the passage 45, the steam escaping to the atmosphere, if desired, and the water falling back into the receptacle 35. It will be seen, therefore, that by so proportioning the areas of the openings 45 and 46 within limits which may be determined, the too rapid rise of water and steam into the coffee grounds receptacle 35 will be overcome and fracture or breakage of the said receptacle will be prevented without necessity for the operator to very closely watch the said operation.

In addition to the foregoing, the construction and operation herein described provide for the movement of the steam and water upwardly through the coffee grounds in a series of small columns, thus more evenly extracting the flavor from the coffee. If the steam and water were permitted to rise rapidly and unevenly through the said grounds, much of the flavor would be lost because it would escape with the steam, to the atmosphere. Here, however, it will be noted that a by-pass is provided for diverting a portion of the steam directly to the atmosphere without contact with the grounds, thus obviating the aforementioned objection, the by-pass 45 permitting only the normal heating portion of steam to enter the openings 46 in the flange-like member 43 and rise upwardly through liquid in the receptacle to maintain the liquid at the proper brewing temperature during the brewing operation.

The brewing operation may be effected by the improvement herein described under a constant moderately high flame, the operator only being required to watch the color of the brew, and when the color is as desired, remove the brewer from over the flame so as to enable the brew to return to the liquid vessel, in accordance with well known procedure, since the lower vessel is sealed except for its connection with the coffee grounds receptacle.

It will be seen that the extraction of the flavor from the coffee grounds takes place at a relatively high temperature and virtually all of the flavor is extracted and does not escape with the steam.

Adjacent the steam dome 5 in Figure 3, a resilient bumper member 75 may be provided so as to preclude the possibility of breaking the member 4 when ejecting the grounds from the receptacle. An enlarged portion 76 on the substantially tubular member 14 may in like manner be provided, to enable the easy manipulation of the ejector 14.

Having thus described my invention, what I claim as new and desire to secure by Letters Patent of the United States, is:

1. A coffee maker comprising a liquid vessel, a grounds receptacle supported by said vessel and in communication therewith and supporting and ejecting means for grounds received in the grounds receptacle comprising an apertured flange member movable upwardly in and of substantially the same interior diameter as the grounds receptacle, and including a handle member extending upwardly from the central portion of the flange member, a filter cloth carried by and extending over the upper surface of the flange member, and having a roll portion snugly embracing the handle member adjacent to the point of juncture thereof with the flange member, and a gasket-like member surrounding the flange at the edge thereof and engaged by the filter cloth and adapted with the cloth to perform a wiping action against the inner wall of the grounds receptacle on removal of the flange member.

2. A coffee maker comprising a liquid vessel, a grounds receptable above the liquid vessel in communication therewith and the interior of which receptacle is of a substantially cylindrical conformation, supporting and ejecting means seated in said receptacle and comprised of an apertured flange member of substantially the same diameter as the said interior, having openings therein, a handle member projecting upwardly from the central portion of said flange, a removable filter cloth carried by said flange and extended over its apertured surface area, said cloth having a roll portion interengaged with a groove at the flange periphery, and also a roll portion surrounding and interengaged with a groove in the handle at a point adjacent to the juncture of the handle and flange.

JOSEPH McMENAMIN.